United States Patent [19]

Sukai et al.

[11] Patent Number: 4,746,220
[45] Date of Patent: May 24, 1988

[54] SCREW TYPE EXTRUDING OR KNEADING MACHINE AND SCREW USED THEREIN

[75] Inventors: Kiyoshi Sukai, Tokyo; Keizo Ichii; Shigeru Takane, both of Toyohashi; Takayuki Yoshikawa; Hiroshi Inada, both of Nagoya; Takao Yamada, Nishikamo, all of Japan

[73] Assignees: Noritake Co., Limited, Aichi; Mitsubishi Rayon Engineering Co., Ltd., Tokyo, both of Japan

[21] Appl. No.: 852,220

[22] Filed: Apr. 15, 1986

[30] Foreign Application Priority Data

Apr. 18, 1985 [JP] Japan ................................ 60-081442
Apr. 18, 1985 [JP] Japan ................................ 60-081443

[51] Int. Cl.⁴ .............................................. B01F 7/08
[52] U.S. Cl. ..................................... 366/79; 425/183; 425/207; 425/209; 366/318
[58] Field of Search .................. 366/79, 88, 322, 323, 366/318, 325, 331; 264/349; 425/182, 183, 190, 193, 200, 204, 205, 207, 208, 168, 376 R

[56] References Cited

U.S. PATENT DOCUMENTS

| | | | |
|---|---|---|---|
| 3,900,188 | 8/1975 | Seufert | 366/79 |
| 4,036,540 | 7/1977 | Seufert | 425/192 R |
| 4,289,410 | 9/1981 | Anders | 366/79 |
| 4,462,691 | 7/1984 | Boguslawski | 366/90 |
| 4,513,807 | 4/1985 | Rose et al. | 65/33 |
| 4,530,761 | 7/1985 | Koch et al. | 210/407 |
| 4,599,002 | 7/1986 | Gutknecht | 425/204 |
| 4,600,311 | 7/1986 | Mourrier et al. | 425/376 R |

Primary Examiner—Jan H. Silbaugh
Assistant Examiner—Jill L. Fortenberry
Attorney, Agent, or Firm—Oblon, Fisher, Spivak, McClelland & Maier

[57] ABSTRACT

The outer periphery of a screw and the inside of a barrel of a screw type extruding or kneading machine are made of ceramics, to improve the abrasion and heat resistances thereof, so that the screw and the barrel will operate for a longer life time even if a hard material or a material containing a hard material is worked.

14 Claims, 6 Drawing Sheets

SCREW TYPE EXTRUDING OR KNEADING MACHINE AND SCREW USED THEREIN

BACKGROUND OF THE INVENTION

1. Field of the Invention

The present invention relates to a screw type extruding or kneading machine and a screw used therein.

Note, in this specification, including the claims, the term "an extruding machine" indicates any machine in which a material to be worked is moved by means of a screw revolving in a barrel, and includes, for example, a so-called "extruder" and an injection molding machine. The application of the extruding and kneading machines mentioned herein is not limited to the working of special materials but may be used for working plastics, ceramics, metalparticles, composite materials comprising polymers and inorganic fibers and/or inorganic powders, and any other material. In particular, they are suitable for working a hard material or a material containing a hard material.

2. Description of the Related Art

Various types of extruding and injection molding machines are used in the processes for melt spinning synthetic fibers and shaping synthetic resins. In this connection, new materials and composite materials have been developed and are in practical use. These are made by mixing hard fibrous materials such as glass fibers, metal fibers, inorganic fibers, carbon fibers, or other fibers, with a polymeric material during the mixing (prior to spinning or molding) of a pigment, stabilizer, or titanium oxide, etc., or during the premixing or shaping of resin composite materials.

Heretofore, all machines used for such mixing, extruding, pressing, shaping, and the like, have been made of steel. To improve the abrasion resistance and chemical resistance of these machines, improvements in the hardness of the steel surface by, e.g., alloying, plating, and fusion bonding of different metals, have been proposed, and some of these improvements are in practical use.

As the functions of the above-mentioned composite materials are improved, the heat resistances of the polymeric materials become higher and strength imparting components to be mixed become even harder. In such situations, the hardness of the metals of the above working machines can provide only a limited, usually insufficient, abrasion resistance. As a result, machine parts must often be renewed at very short intervals, which causes problems such as cost increases, reduced productivity, and destabilized molding conditions (for example, extruded products are remarkably varied between start-up and shut-down of machines, due to this remarkable abrasion) and the thus-necessitated exchanges of equipment.

Another problem is an incorporation of a metal into a working material, caused by the abrasion of the working machine. This is a particular problem when working recent super high pure materials.

SUMMARY OF THE INVENTION

The present invention obviates the above-mentioned problems by providing a screw type extruding or kneading machine (e.g., a melt extruder, an injection molder or a kneader), which extrudes or kneads a material to be worked by means of a screw axially revolving in a vessel of the machine, in which a part or whole of the outside surface of the screw expected to come in contact with the material to be worked, as well as a part or whole of the inside surface of the vessel expected to come in contact with the material to be worked, are made of ceramics, respectively.

Thus, the above-mentioned problems may be solved by replacing the portion of a melt extruder, an injection molder, a kneader, etc., which will come in contact with a working material, with a material having an excellent resistance to abrasion and heat. Metal fibers, glass fibers, and other fibers or powders of inorganic materials, ceramic materials, metal oxides, and the like, have a high hardness, but only ceramic materials have a hardness and heat resistance equal to or higher than those of the above-mentioned hard materials to be worked, and can be put to commercial use at a low cost.

On the other hand, ceramic materials have a high hardness but are low in resistance to mechanical impact, toughness, thermal expansion coefficient, heat conductivity, etc. Therefore, the driving portion, a portion subjected to large thermal differences, a portion impacted by or in contact with solid materials, and the like, of an extruding or kneading machine should be made of metal, for the above-mentioned reasons.

Thus, in the present invention, only a portion of an extruding or kneading machine which should possess a high abrasion resistance and hardness is made of ceramics and the remainder of the machine is made of metal and the like.

The ceramic portion is preferably capable of being separately dismantled or renewed, particularly at a damaged part thereof, since a ceramic portion is considered susceptible to damage such as chipping, cracking, etc., during disassembly and assembly of the machine for repairing, washing etc., due to the insufficient toughness of the ceramics.

The present invention also obviates the above-mentioned problems by providing a screw for an extruding or kneading machine, in which the screw comprises a ceramics member constituting a part or the whole of a portion defining a spiral groove at the outer periphery of the screw and the ceramics member can be dismantled from the screw, as an exchangeable part.

In this specification, the term "ceramics member" means a sintered ceramics member which is expected to come in contact with materials to be worked and which, if necessary, can be exchanged for a new member when damaged.

Preferably, a buffer made of a plastic material, etc., is inserted between the ceramics member and the metal member, and between the ceramics members themselves if a plurality of ceramics members are used, in a screw and/or a vessel of an extruding or kneading machine.

BRIEF DESCRIPTION OF THE DRAWINGS

The present invention is described in detail below with reference to the drawings, in which.

DESCRIPTION OF THE PREFERRED EMBODIMENTS

First, a melt extruder is described as a typical example of a screw type extruding machine. However, this description can be also applied to a kneader, etc.

Figure 1:
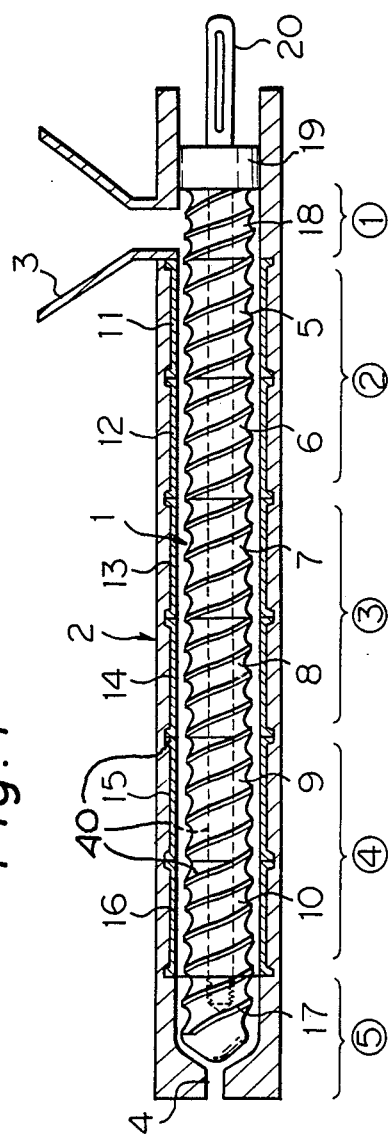
FIG. 1 is a partially broken side view of an extruding machine according to the present invention.

FIG. 1 shows an example of a melt extruder in which reference numeral 1 denotes a screw, 2 a barrel, and 3 a hopper. A raw material is fed from the hopper 3 and moved in the barrel 2, by means of the screw 1, in the following sequence: pushing zone ①→ compressing zone ②→ melting zone ③→ melting zone ④→ mixing zone ⑤→. During this movement, the raw material is subjected to pushing, compressing, melting, metering, and mixing respectively, and is then extruded from a throttling gate 4 to form a desired profile. In the figure, a die, a heating zone, a cooling zone, a vent, a bearing, a driving portion a metering hopper, various metering devices, and other parts are not shown, since these parts are the same as used in a conventional melt extruder.

In the melt extruder shown in FIG. 1, the parts for which ceramic members are used are the outer surface portions, expected to come in contact with a material to be worked, of the screw 1 and the barrel 2, in the compressing, melting and metering zones ② to ④; i.e., the ceramic parts are a plurality of members 5 to 10 of the screw 1 and a plurality of members 11 to 16 of the barrel 2. The members 17 to 20 of the screw 1 and the body of the barrel 2 and the hopper 3 are made of a metal, generally steel. The members 5 to 10 are cylindrical and there is a single metal axle (i.e., core shaft) inside the cylinderical ceramics members 5 to 10.

The members 17 to 20 and the axle of the screw 1 are not made of ceramics because the axle and the member 20 are subject to torsional stress caused by a large driving force at start-up and shut-down, because the members 17 and 19 are occasionally damaged during dismantling or assembly of the screw when changing products or for washing, and because the member 18 is under impact by solid matter fed from the hopper 3. The members 17 and 18 can be made of ceramics if materials to be worked so allow. The body of the barrel 2 is made of a metal because, as a structural member, it requires durability against attacks from the outside, and for various other reasons. The lengths of the portions of the screw and the barrel where ceramic members should be used depends on the properties of the ceramics, the intended interval of time for exchanging of the screw and the barrel, types of products to be molded, and the like, and therefore, are not limited to those of the example shown in FIG. 1.

Figure 2:
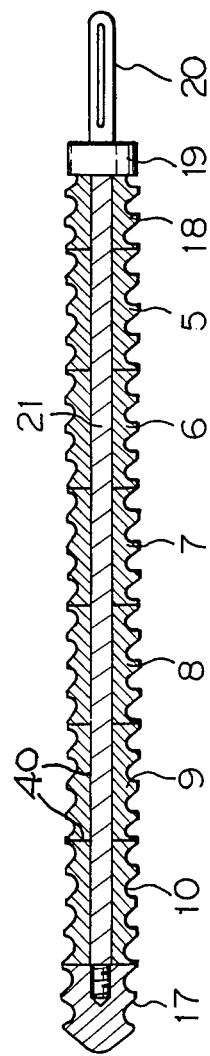
FIG. 2 is a sectional side view of a screw of an extruding machine according to the present invention.
Figure 5:
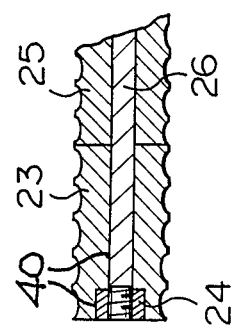
FIG. 5 is a sectional side view of a portion of another screw and shows an assembly thereof in which the top portion is equipped with ceramic members.

FIG. 2 shows a cross section of the screw in which ceramic members are used. The cylindrical ceramics members 5 to 10 having a spiral groove at the outer periphery thereof are fitted to a metal axle 21. The members 17 and 18 also have a spiral groove at the outer periphery thereof and may be a monobloc of the axle 21 or may be a part separated therefrom. The members 17 and 18 may be made of steel or ceramics. The member 17 may be assembled with the axle in a manner as shown in FIG. 5. At least one of the both ends of the axle must be separated from the axle.

The cylinderical ceramics members 5 to 10 may be assembled to the axle 21 by adhesion, with an adhesive such as epoxy, melamine, and phenol adhesives, or may be assembled to the axle 21 in such a way that they can be dismantled or renewed independently. In the latter case, for example, the member 17 or the member 18 or 19 may be connected to the axle 21 with a thread and is engaged by turning the thread in a direction which is the reverse of that in which the screw revolves, so that the cylindrical ceramics members 5 to 10 are firmly assembled to the axle even during operation of the screw.

In an extruder according to the present invention, buffers 40 are preferably inserted between the ceramics members and the metal members and between the ceramics members themselves, to distribute stress uniformly to the interfaces between the ceramics members and the metal members and between the ceramics members themselves, or to absorb stress caused by heat changes during operation due to different thermal expansion coefficients between the metals and ceramics, or to absorb shocks when driving starts. A buffer 40 is not necessary if the ceramics member is assembled to the metal member by adhesion, since the adhesive acts as a buffer. If a ceramics member is assembled in such a way that it can be dismantled for exchange, etc., a heat resistant synthetic film such as polyimide, polyamide, polysulfone or synthetic rubber film, or a foil such as copper or aluminum foil, or metal or resin coating, or metal plating may be used as a buffer, or a buffer may be formed by applying a resin such as epoxy, melamine or phenol onto a metal or ceramics member. A buffer made of plastics, or any other materials having plasticity, is particularly preferable.

FIGS. 3A to 3D show the spiral grooved cylindrical ceramics members 5 to 10. Profiles of the spiral grooves 22 formed at the outer periphery of the cylindrical ceramics members 5 to 10 are determined by the materials to be worked and the extrusion conditions, but they should form a single continuous helical groove when a plurality of the cylindrical members 5 to 10 are assembled on the axle. In FIG. 1, the groove 22 becomes deeper in the direction from the zone ① to the zone ⑤ along the screw 1, although the present invention is not limited to this constitution.

Figures 3A, 3B:
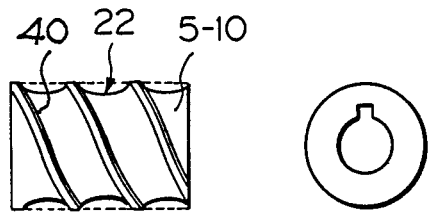
FIGS. 3A to 3D are a front view and side views of cylindrical ceramic members with a spiral groove.
Figure 3C:
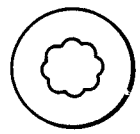
Figure 3D:
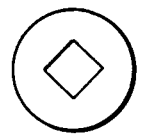

The cylindrical ceramics members 5 to 10 have a longitudinal hole inside the members along the central axis, into which the metal axle 21 is fitted. The longitudinal hole can be a true circular section if the cylindrical members 5 to 10 are adhered to the axle 21. The cylindrical ceramics members 5 to 10 should, however, have a longitudinal hole with a key way or a longitudinal hole with a non-circular section different from a true circle section, as shown in FIGS. 3B, 3C or 3D, so as to inhibit revolution of the cylindrical ceramics members 5 to 10 in section to the axle 21 if the cylindrical ceramics members 5 to 10 are assembled in such a way that they can be dismantled.

If the member 18 is made as an independent member from the axle 21, the shape of the member 18 may be similar to those shown in FIGS. 3A to 3D.

The material of the cylindrical ceramics members 5 to 10 having a spiral groove may be a sinter based on alumina, zirconia, silicon nitride, etc., which are highly abrasion and heat resistant. A sinter comprising 80% or more by weight, more preferably 85 to 98% by weight, of alumina is particularly suitable because it has excellent abrasion resistance, shock resistance, heat resistance, and formability. A sinter based on partially stabilized zirconia may be suitable where a resistance against a large load and shocks during operation is required.

The cylindrical ceramics members 5 to 10 may be fabricated by forming and sintering in a conventional manner. The starting particles preferably have a particle size of less than 5 μm, particularly about 1 to 3 μm, to improve the surface smoothness of the sintered members. In the step of forming, the profile and size of the shape are made in such a way that shrinkage during sintering is taken into account, but that grinding may be carried out, as required, to improve the fineness of the dimensions after sintering.

Figure 4:
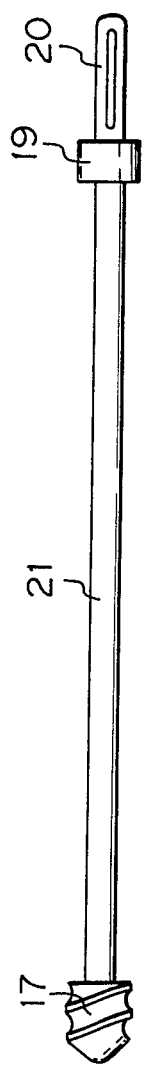
FIG. 4 is a front view of an axle of a screw (i.e., core shaft)

FIG. 4 shows the metal axle 21 and the cap metal member 17. The axle 21 should have a sectional thickness large enough to be durable against a maximum torsional stress applied to the screw during operation or working. The cap metal member 17 is made by machining and is fitted with, for example, a thread connection, on the axle 21 in such a manner that the direction in which the thread is turned for connection is the reverse of the direction in which the screw revolves during working.

FIG. 5 illustrates an assembly of a top end ceramics member 23 and a penultimate ceramics member 25 assembled to an axle 26 of a screw. The top end ceramics member 23 with a spiral groove is assembled to the axle 26 by means of a top metal member 24 inside the top end ceramics member 23.

Figure 6:
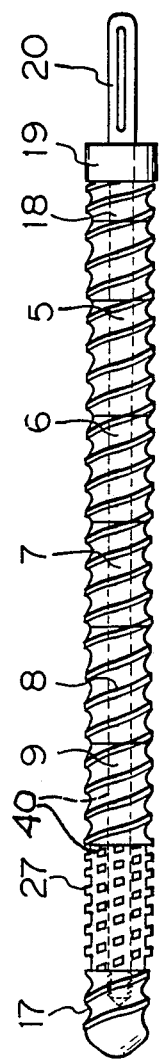
FIG. 6 is a front view of still another screw.

FIG. 6 shows a screw which has a cylindrical ceramics member 27 having a special shaped groove near the top end of the screw in order to enhance the mixing effect. Thus, as a screw according to the present invention may comprise divided exchangeable ceramics members, the screw can have a desired tooth profile by appropriately combining ceramics members having various shaped grooves.

Figure 7A:
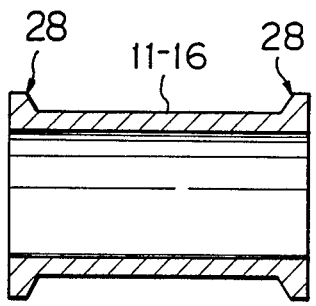
FIGS. 7A and 7B, 8A and 8B, and 9A and 9B are sectional front views and side views respectively of ceramic barrel lining members.
Figure 7B:
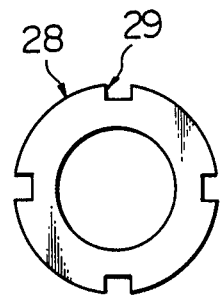
Figure 8A:
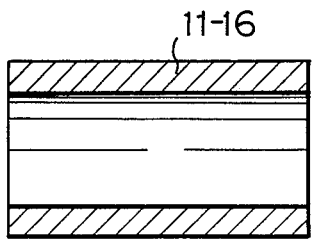
Figure 8B:
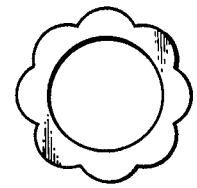
Figure 9A:
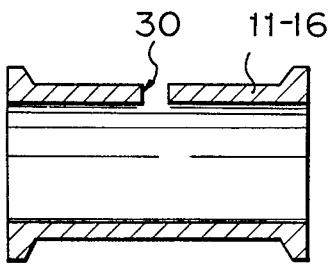
Figure 9B:
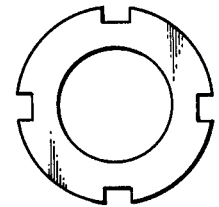

FIGS. 7A and 7B, 8A and 8B, and 9A and 9B show examples of the ceramics barrel members 11 to 16. In this specification, the term "ceramics barrel member" means a sintered ceramics member which is expected to come in contact with materials to be worked and which is assembled at the inside wall of the barrel. The ceramics barrel members 11 to 16 are approximately cylindrical, and have flanges 28 with a groove 29 at both ends of the cylindrical ceramics members, as shown in FIGS. 7A and 7B, or have sections different from a true circular section, as shown in FIGS. 8A and 8B, in order to assemble the ceramics barrel members 11 to 16 in such a way that they are immobilized in the body of the barrel 2. If a vent is necessary, a vent hole 30 should be made in the ceramics barrel members 11 to 16 in addition to a vent hole in the body of the barrel 2.

The material composition and the production of the ceramics barrel members 11 to 16 may be similar to those of the cylindrical ceramics members 5 to 10. Moreover, buffers as mentioned before are preferably inserted between the ceramics barrel members 11 to 16 and the body of the metal barrel 2, and between the ceramics barrel members 11 to 16 themselves.

Figure 10:
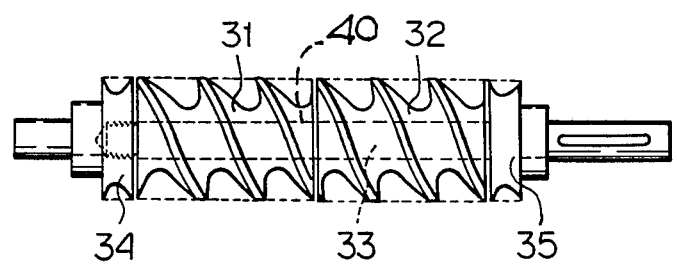
FIG. 10 is a front view of a screw of a kneader according to the present invention.
Figure 11:
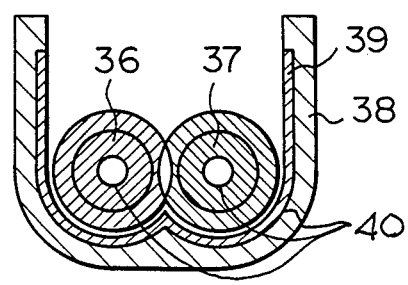
FIG. 11 is a sectional side view of a twinscrew kneader according to the present invention.

FIG. 10 shows an example of a screw for a kneader. The kneading screw comprises cylindrical ceramics members 31 and 32 having a groove at the outer periphery thereof. A metal axle 33 passes through the inside of the cylindrical ceramics members 31 and 32 which are fixed by an assembly of the metal axle 33 and end members 34 and 35. The production and assembly of the kneading screw are similar to those of an extruding screw, although the kneading screw generally has a spiral groove deeper than that of an extruding screw. FIG. 11 shows a twin-screw kneader comprising two such screws 36 and 37. A vessel 38 of the twin-screw kneader has ceramics inside wall members 39 at the inside wall thereof. In this specification, the term "ceramics barrel member" means a sintered ceramics member which is expected to come in contact with materials to be worked and which is assembled at the inside wall of the barrel. The construction of a kneader may comprise mono-, twin- or multi-screw kneader(s) as in the prior art.

According to the present invention, the abrasion and heat resistances of extruding and kneading machines are improved and the improved extruding and kneading machines are suitable for working hard materials or materials containing hard materials.

Although examples of the present invention will be described below with reference to the workability of a composite material of a hard material in a resin, it is clear that the present invention is also effective for working ceramics, etc.

EXAMPLE 1

A melt extruder based on a conventional melt extruder having mixing, metering, melting, compressing, and pushing zones was made, with portions of a screw and a barrel being made of ceramics, as shown in FIG. 1.

Refering to FIG. 2, to constitute a central portion 1680 mm long, i.e., from the metering zone through the melting zone to the compressing zone, of the whole 2000 mm long spiral groove by ceramics, six cylindrical alumina members with a spiral groove 280 mm long, as shown in FIG. 3, were made.

To make the cylindrical alumina members, 100 parts by weight of alumina powders (purity 92% by weight) having particle sizes of 3 μm or less, 65 to 70 parts by weight of water, and 2 to 6 parts by weight of polyvinylalcohol were well mixed and granulated by a spray dryer, followed by shaping into hollow cylindrical members having an outer diameter of 77 mm, inner diameter of 45 mm and length of 333 mm and having a key way. The cylindrical members were subject to cutting and knurling to form a shape shown in FIGS. 3A and 3B. The spiral grooves of the cylindrical members have the same pitch (74.7 mm) and the same crest profile, but the depths of the valleys are gradually increased from one end (8.1 mm) to the other end (20.7 mm) of the successively arranged cylindrical members. The thus-obtained shape was sintered at 1650° C. for one hour.

As ceramics barrel members, six alumina tubes having a shape as shown in FIGS. 7A and 7B were made. The material composition and production of these tubes were similar to those of the cylindrical alumina members mentioned above. The alumina tubes had an inner diameter of 65 mm, outer diameter of 85 mm, and length of 280 mm, and comprised flanges having an outer diameter of 105 mm and a thickness of about 12 mm at both ends thereof, each flange having four grooves.

By machining steel materials, an axle and a cap member, as shown in FIG. 4, and a spiral grooved cylindrical member for a pushing zone, as shown in FIG. 1, were made. The axle had an outer diameter of 38 mm and a length of 2000 mm at the portion to which the cylindrical members were to be fitted, and the axle was machined to have a thread at the top end thereof and a key way along the fitting portion. Near the other end of the axle, a stopper 19, having approximately the same outer diameter as the inner diameter of the barrel, and having a role of stopping backward movement of a working material, and a portion 20 for connection to a driving device (not shown) were made. The thus-machined axle, cap member, and cylindrical member were subject to hard chromium plating on the surfaces thereof.

The body of the barrel was basically the same as a conventional barrel but was machined to receive aluminum barrel members inside the barrel, from a metering zone through a melting zone to a compressing zone.

When the screw and barrel were assembled, polyimide films having a thickness of 0.2 mm were inserted, as buffers, between the ceramics members and the metal members and between the ceramics members themselves.

Thus, a melt extruder was produced.

Using this melt extruder, polyester polymer containing 30% by weight of short cut glass fibers and 20% by weight of titanium oxide was melt extruded to form a shape of the above composite material and this operation was continued. The screw and the inside face of the barrel were found to be durable, without signs of abrasion, for a working period of more than one year.

In contrast, if melt extrusion of the composite material was carried out under the same conditions as the above in a conventional extruder using a steel screw and a steel barrel plated with hard chromium, the mixing quality of a product deteriorated and the amount of extruder output was reduced to 80% or less after continuous operation for 24 hours. After 3 week continuous operation, the extruder became inoperable.

In an extruder according to the present invention, the barrel and the screw could be easily dismantled to renew the ceramics barrel members or cylindrical ceramics screw members.

EXAMPLE 2

A melt extruder similar to that of Example 1 was made. However, in the melt extruder of this Example, the spiral groove portion of a screw had a total length of 2190 mm and an outer diameter or maximum diameter of 65 mm. Six alumina blocks and two zirconia blocks, each having a length of 250 mm, were made as the spiral grooved cylindrical ceramics members. These cylindrical members were fitted to a steel axle with a hard chromium plating and the zirconia blocks were arranged near the top of the screw. At the top of the screw and at the pushing zone, steel members with a groove at the outer periphery thereof and with a hard chromium plating were used as in Example 1.

As the ceramics barrel members, five tubes with flanges at both ends and having a length of 250 mm and an inner diameter of 65 mm were made, three of these members were made of alumina and two were made of silicon nitride. In assembling the barrel, zones from the metering zone through the melting zone to compressing zone were composed from the three alumina barrel members having a length of 750 mm, the two silicon nitride barrel members having a length of 500 mm, and a portion of the steel barrel without a ceramics barrel member having a length of 750 mm. Three vents were made near the top of the barrel.

A top gate portion of the extruder was made by making the inside of a throttle gate of zirconia and protecting the outside thereof with a steel member.

In this extruder, cross-linkable polyester containing 60% by weight of a mixture of inorganic particles such as titanium oxide, magnesium silicate and aluminium oxide particles, and silicon nitride whiskers, was melt extruded as a composite material. After six months of continuous operation, the operation was still good and there was no apparent change, which was confirmed by measuring the extruding pressure and other factors.

In contrast, when the above composite material was melt extruded under the same conditions as the above in a conventional melt extruder made of steel with a hard chromium plating and having the same profile as the above, remarkable abrasion occurred after one week of operation, and padding of the screw each week and padding of the barrel each month became necessary.

EXAMPLE 3

A screw for a kneader was made in the same manner as for that of Example 1. The profile of this screw was as shown in FIG. 10. The length of the effective spiral groove was 600 mm. The depth of the groove, about 22 mm, was deeper than that of the screw for an extruder and did not vary along the groove. Two cylindrical alumina members with a spiral groove and having a length of 250 mm composed a screw.

A twin-screw kneader as shown in FIG. 11 was composed using the above alumina screw. Alumina ceramics inside wall members were arranged inside a vessel of the kneader.

In this kneader, acrylonitrile-butadiene styrene (ABS resin) containing 50% by weight of magnesium silicate, zinc oxide, glass fibers, and a stabilizer, was heat-kneaded to produce a premix intermediate product. As a result, the lifetime of the kneading screw was extended by 12 to 15 times that of a conventional steel kneading screw with a hard chromium plating.

In the case of this kneader, it was not always necessary to have a surface finishing fineness of the ceramics members, and fine finishing of the members prior to sintering was sufficient.

We claim:

1. A screw type machine that works a material, said machine comprising a screw axially disposed for revolving in a vessel, wherein:
   (a) at least a part of the outside surface of said screw that comes into contact with the material to be worked comprises a plurality of ceramic members and the remainder of said screw comprises a plurality of metal members;
   (b) at least a part of the inside surface of said vessel that comes into contact with the material to be worked comprises a plurality of ceramic members and the remainder of said vessel comprises a plurality of metal members;
   (c) said ceramic members of both said screw and said vessel are dismountable and replaceable; and
   (d) buffer means for distributing stress uniformly, for absorbing stress caused by heat changes, and for absorbing mechanical shocks are interposed between said ceramic members and said metal members in both said screw and said vessel, said buffer means being a heat resistance synthetic film selected from the group consisting of polyimide, polyamide, polysulfone, and synthetic rubber films.

2. A machine as recited in claim 1 wherein said buffer means is also interposed between said ceramic members in said screw.

3. A machine as recited in claim 1 wherein said buffer means is also interposed between said ceramic members in said vessel.

4. A machine as recited in claim 1 wherein a spiral groove is formed in the outside surface of said screw.

5. A machine as recited in claim 1 wherein one of said metal members in said screw is an axle on which said ceramic members of said screw are removably mounted.

6. A machine as recited in claim 1 wherein said machine is an extruder.

7. A machine as recited in claim 1 wherein said machine is a kneader.

8. A screw type machine that works a material, said machine comprising a screw axially disposed for revolving in a vessel, wherein:
   (a) at least a part of the outside surface of said screw that comes into contact with the material to be worked comprises a plurality of ceramic members and the remainder of said screw comprises a plurality of metal members;
   (b) at least a part of the inside surface of said vessel that comes into contact with the material to be worked comprises a plurality of ceramic members and the remainder of said vessel comprises a plurality of metal members;
   (c) said ceramic members of both said screw and said vessel are dismountable and replaceable; and
   (d) buffer means for distributing stress uniformly, for absorbing stress caused by heat changes, and for absorbing mechanical shocks are interposed between said ceramic members and said metal members in both said screw and said vessel, said buffer means being a foil selected from the group consisting of copper foil and aluminum foil.

9. A machine as recited in claim 8 wherein said buffer means is also interposed between said ceramic members in said screw.

10. A machine as recited in claim 8 wherein said buffer means is also interposed between said ceramic members in said vessel.

11. A machine as recited in claim 8 wherein a spiral groove is formed in the outside surface of said screw.

12. A machine as recited in claim 8 wherein one of said metal members in said screw is an axle on which said ceramic members of said screw are removably mounted.

13. A machine as recited in claim 8 wherein said machine is an extruder.

14. A machine as recited in claim 8 wherein said machine is a kneader.

* * * * *